(No Model.)
W. H. CUMMINGS.
FRICTION CLUTCH.
No. 449,312. Patented Mar. 31, 1891.
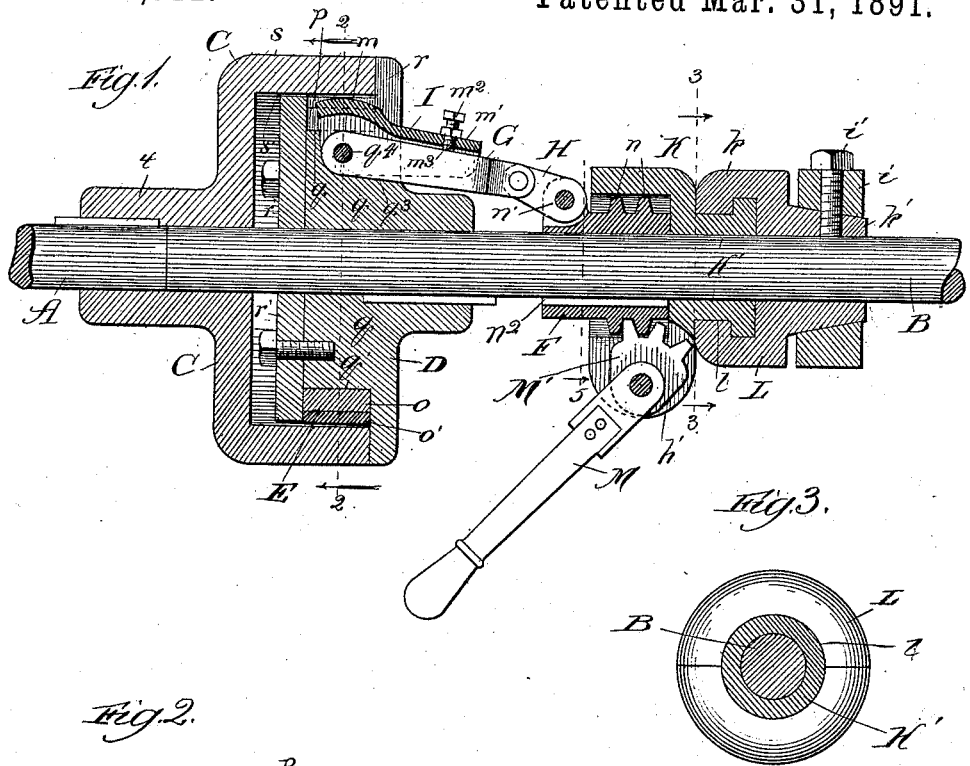
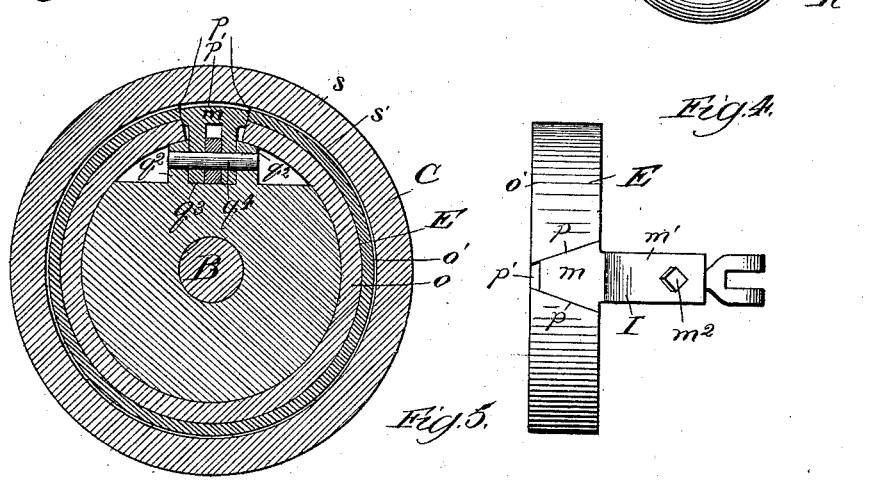
Witnesses:
Inventor:
William H. Cummings,

UNITED STATES PATENT OFFICE.

WILLIAM H. CUMMINGS, OF CHICAGO, ILLINOIS.

FRICTION-CLUTCH.

SPECIFICATION forming part of Letters Patent No. 449,312, dated March 31, 1891.

Application filed November 3, 1890. Serial No. 370,101. (No model.)

*To all whom it may concern:*

Be it known that I, WILLIAM H. CUMMINGS, a citizen of the United States, residing at Chicago, in the county of Cook and State of Illinois, have invented a new and useful Improvement in Friction-Clutches, of which the following is a specification.

My object is to provide an improved friction-clutch for shaft-couplings, pulley-wheels, sprocket-wheels, &c., which shall be of a comparatively simple, durable, and economical construction, and more readily operative and reliable in its operation than other devices of the same character hitherto employed.

In the drawings, Figure 1 is a longitudinal sectional view of a clutch-coupling provided with my improved friction-clutch in operative position upon a rotary shaft and a shaft to be driven thereby, the clutch mechanism being in the state of release, which permits the driving-shaft to rotate without giving motion to the other shaft; Fig. 2, a section taken on the line 2 2 of Fig. 1 and viewed in the direction of the arrows; Fig. 3, a section taken on line 3 3 of Fig. 1 and viewed in the direction of the arrows; Fig. 4, a view illustrating details of the construction, and Fig. 5 a broken section taken on line 5 of Fig. 1 and viewed as indicated.

A is a driving-shaft, and B a shaft to be driven thereby, although this arrangement is not material, as the operation of the clutch mechanism hereinafter described would be the same if the positions of the parts thereof shown to be on the respective shafts were reversed.

C is a wheel, having the reduced portion or hub $t$, at which it is keyed to the end of the shaft A, and the flanges or rim $s$, affording an internal annular friction-surface $s'$, extending over the end portion of the shaft B.

Keyed to the shaft B is a collar D, having the annular flange $r$, which abuts against the edge of the rim $s$, and reduced part $q$, affording an annular face $q'$, extending into the rim $s$. The collar D is recessed from one side, as shown, to afford the ribs $q^2$ and central recess $q^3$.

E is a divided expansion-ring, with beveled ends $p$ at the place of separation, affording between them an outwardly-flaring recess $p'$. The expansion-ring comprises, preferably, an annulus of spring metal $o$, provided over its outer surface with a strip of rawhide or other friction-producing material $o'$. The ring contracts normally about the part $q$, the friction-strip $o'$ extending close to but out of frictional contact with the surface $s'$. The expansion-ring is confined laterally between the flange $r$ and a removable annular plate $r'$, which is held to the collar D by bolts, as shown.

Upon the shaft B is a loose sliding collar F, provided on its outer periphery with the annular teeth $n$ and an ear $n'$. The collar F is prevented from independent rotation on the shaft by a feather $n^2$, which does not, however, interfere with the longitudinal sliding of the collar.

G is a lever extending at one end into the recess $q^3$ in the collar D, where it is fulcrumed upon a pin $q^4$, passing through the ribs $q^2$, being pivotally connected at its opposite end with the ear $n'$ on the collar F by a link H. Fulcrumed on the pin $q^4$ at opposite sides of the lever G is a spreader I, preferably of the shape shown, having a wedge-shaped head $m$, which extends into the recess $p'$ and the body portion $m'$, which extends along the lever.

K is a sleeve extending part way over the collar F and integral with a collar K', which is loose upon the shaft, and is provided in its outer periphery with an annular groove $l$. The sleeve and collar K K' are held in place without rotating with the shaft by a split collar L, which extends at one end $k$ over the end of the collar K' into the groove $l$, and is shaped at its opposite end $k'$ to the form of a cone-frustum, over which is driven a ring $i$, with a beveled inner surface, to clamp the collar firmly to the shaft, the ring being held against slipping by a set-screw $i'$, which passes through the ring into a socket in the collar. The sleeve K is provided longitudinally with a recess $h$, flanked on opposite sides by bearing projections $h'$, and fulcrumed to the projections $h'$ in the intermediate recess $h$ is a lever M, having a head M', affording a segmental rack, the teeth of which are arranged to mesh loosely with the annular teeth $n$.

The clutch mechanism as it is illustrated in the drawings is in the state of release, whereby the shaft A and wheel C may rotate without turning the shaft B.

To lock the shafts together, the lever M is swung down from the position shown toward the vertical plane, which causes it to move the collar F toward the collar D. Owing to the link-connection between the collar F and lever G, this movement of the former causes the said lever to be swung outward upon its pivot $q^4$, and by bearing against the part $m'$ of the spreader I swing the latter also upon its pivot at $q^4$ and crowd its head $m$ into the recess $p'$, to force the ends $p$ of the expansion-ring in the direction away from each other and expand the latter uniformly against the friction-surface $s'$ of the wheel C. The entire peripheral surface of the expansion-ring is brought into contact with the surface $s'$, so that the widespread engagement thus effected produces the maximum degree of friction and limits the tendency of the engaging surfaces, particularly at the start, to slip one upon the other.

To compensate for any wear upon the ends $p$ of the expansion-ring or the engaging edges of the wedge $m$, the spreader I is rendered adjustable with relation to the lever G by means of an adjusting-screw $m^2$. The part $m'$ of the spreader is provided with a threaded opening $m^3$, through which the adjusting-screw is passed to bear against the surface of the lever. Turning of the screw to separate the part $m'$ of the spreader and the lever turns the spreader upon its pivot to cause its head $m$ to extend farther beyond the pivoted end of the lever G, whereby it will enter the recess $p'$ a proportionately greater distance.

All the parts of the clutch mechanism, except the sleeve and collar K K', and consequently the lever M, rotate with the shaft, the weight of the lever M, in the absence of material friction between the collars K' and L and between the teeth $n$ and segmental rack, operating to prevent rotation of the parts excepted.

When the lever M is swung back to the position shown in the drawings, the lever G is drawn toward the shaft, when the expansion-ring E will contract by its resilience, and the beveled edges $p$ will force out the wedge-shaped head of the spreader. The lever M, when swung down, will maintain the head of the spreader against being forced out of position by the contractive power of the expansion-ring. It is not capable of its own weight, however, when swung to the position shown in the drawings, of forcing the head of the spreader into the recess $p'$ with power sufficient to expand the ring.

Where my improved friction-clutch is to be used for producing engagement and release of a pulley or sprocket-wheel or the like on a shaft, the collars D and L would be secured to the shaft, as described, while the wheel C would be loose thereon, when the clutch mechanism is in the state of being released and connected with the pulley or sprocket-wheel, &c. The latter may be integral with the part $t$ or other part of the wheel, or the part $t$ may be formed to enter and engage the hub of the wheel of whatever character it is desired to have the clutch mechanism engage and release.

My improved friction-clutch occupies comparatively little space on a shaft, and this fact, associated with the certainty and readiness of its operation, makes it peculiarly desirable. The wedge or head $m$ as constructed engages both the collar D and expansion-ring, so that other means, as lugs upon the surface $q$ to engage the expansion-ring and relieve the lever G from strain, and which would obviously interfere materially with the equal expansion throughout of the ring, are unnecessary.

What I claim as new, and desire to secure by Letters Patent, is—

1. A friction-clutch comprising, in combination, a wheel provided with an annular inner face, a collar D, supported in the wheel upon a shaft, a divided expansion-ring about the collar normally out of frictional contact with the said annular face of the wheel, its ends forming a recess $p'$ between them, a lever G, fulcrumed at one end on the collar D, a wedge-shaped spreader I, adapted to expand the ring against the said annular face of the wheel, pivoted toward its forward end and extending into the recess $p'$, being supported toward its rear end by the lever G, adjusting means, as the set-screw $m^2$, for raising and lowering the spreader upon its pivot to govern the extent of its projection beyond the fulcrum of the lever G, and actuating mechanism upon the shaft connected with the lever G for swinging it upon its fulcrum to advance or retract the spreader, whereby frictional contact between the expansion-ring and wheel may be produced or released at will, substantially as described.

2. A friction-clutch comprising, in combination, a wheel provided with an annular inner face, a collar D, supported in the wheel upon a shaft, a divided expansion-ring about the said collar normally out of frictional contact with the said annular face of the wheel, its ends forming between them a recess $p'$, a sliding collar F on the shaft, provided with annular teeth $n$, a spreader connected with the sliding collar and adapted to enter the said recess to expand the ring against the said annular face of the wheel, and an actuating-lever M for the collar F, fulcrumed upon the shaft, to be non-rotary therewith, but held against longitudinal movement thereon, and provided with a head M', having teeth which engage the annular teeth $n$ of the collar, whereby movement of the lever moves the collar F and spreader, and whereby frictional contact between the expansion-ring and wheel may be produced or released at will, substantially as described.

3. A friction-clutch comprising, in combination, a wheel provided with an annular inner face, a collar D, having a recess $q^3$, supported in the wheel upon a shaft, a divided expansion-ring about the said collar normally out of frictional contact with the said annular face of the wheel, its ends forming a recess $p'$ between them in line with the recess $q^3$, a lever G, pivoted in the recess $q^3$, a spreader I, also pivoted in the recess $q^3$ and movable with the lever G and having a wedge-shaped head $m$ extending into the recess $p'$ and adapted to expand the ring into frictional contact with the said annular face of the wheel, and actuating mechanism upon the shaft for turning the lever G and spreader upon their pivots, substantially as and for the purpose set forth.

4. A friction-clutch comprising, in combination, a wheel provided with an annular inner face, a collar D, having a recess $q^3$, supported in the wheel upon a shaft, a divided expansion-ring about the said collar normally out of frictional contact with the said annular face of the wheel, its ends forming a recess $p'$ between them in line with the recess $q^3$, a lever G, pivoted in the recess $q^3$, a spreader I, also pivoted in the recess $q^3$, having a body portion $m'$ extending along the lever and adjustable toward and from the same, and a wedge-shaped head $m$, extending into the recess $p'$ and adapted to expand the ring into frictional contact with the said annular face of the wheel, and actuating mechanism upon the shaft for turning the lever G and spreader upon their pivots, substantially as and for the purpose set forth.

WILLIAM H. CUMMINGS.

In presence of—
   J. W. DYRENFORTH,
   M. J. FROST.